United States Patent
Shaw et al.

(10) Patent No.: US 9,089,933 B2
(45) Date of Patent: Jul. 28, 2015

(54) METHOD FOR MAKING AND REPAIRING EFFUSION COOLING HOLES IN CUMBUSTOR LINER

(75) Inventors: Alan Terence Shaw, Brossard (CA); Robert Sze, Mississauga (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 462 days.

(21) Appl. No.: 12/972,932

(22) Filed: Dec. 20, 2010

(65) Prior Publication Data

US 2012/0152917 A1   Jun. 21, 2012

(51) Int. Cl.
*B23K 26/00* (2014.01)
*B23K 26/38* (2014.01)

(52) U.S. Cl.
CPC .......... *B23K 26/388* (2013.01); *B23K 2201/001* (2013.01)

(58) Field of Classification Search
CPC ............ B23K 26/36–26/388; B23K 2201/001
USPC ................. 219/121.6, 121.61, 121.63, 121.7, 219/121.71, 121.72; 60/772, 752, 754, 755, 60/756; 461/95, 97 R
See application file for complete search history.

(56) References Cited

U.S. PATENT DOCUMENTS

| | | | |
|---|---|---|---|
| 2,222,454 A * | 11/1940 | Zeissl | 451/237 |
| 3,474,219 A * | 10/1969 | Steigerwald et al. | 219/121.35 |
| 5,166,493 A | 11/1992 | Inagawa et al. | |
| 5,247,766 A | 9/1993 | Kildea | |
| 5,702,288 A * | 12/1997 | Liebke et al. | 451/36 |
| 5,771,577 A | 6/1998 | Gupta et al. | |
| 5,941,686 A * | 8/1999 | Gupta et al. | 415/178 |
| 6,004,620 A | 12/1999 | Camm | |
| 6,132,482 A | 10/2000 | Perry | |
| 6,204,475 B1 | 3/2001 | Nakata et al. | |
| 6,234,872 B1 | 5/2001 | Shaw | |
| 6,339,208 B1 * | 1/2002 | Rockstroh et al. | 219/121.71 |
| 6,359,254 B1 | 3/2002 | Brown | |
| 6,380,512 B1 | 4/2002 | Emer | |
| 6,524,395 B1 | 2/2003 | Devine, II | |
| 6,663,919 B2 | 12/2003 | Farmer et al. | |
| 6,864,459 B2 | 3/2005 | Chang et al. | |
| 6,908,657 B2 | 6/2005 | Farmer et al. | |
| 7,186,946 B2 | 3/2007 | Byrd et al. | |
| 7,193,175 B1 | 3/2007 | Chang et al. | |
| 7,329,832 B2 | 2/2008 | Hoebel et al. | |
| 7,932,479 B2 * | 4/2011 | Bialas et al. | 219/121.72 |
| 2006/0201536 A1 * | 9/2006 | Solcz et al. | 134/33 |

* cited by examiner

*Primary Examiner* — Sang Y Paik
(74) *Attorney, Agent, or Firm* — Norton Rose Fulbright Canada LLP

(57) ABSTRACT

A method for making or repairing a laser drilled hole in a component of gas turbine engines, to meet requirements of air flow through the hole, includes deformation of an excess material melted during the laser drilling process and remaining around an opening end of the hole, thereby causing a marginal reduction in an effective diameter of the hole.

15 Claims, 3 Drawing Sheets

METHOD FOR MAKING AND REPAIRING EFFUSION COOLING HOLES IN CUMBUSTOR LINER

TECHNICAL FIELD

The invention relates generally to gas turbine engines and more particularly, to an improved method for making and repairing effusion cooling holes in a combustor liner of gas turbine engines.

BACKGROUND OF THE ART

A combustor is usually provided in gas turbine engines to define a combustion chamber for a combustion reaction taking place therein to produce combustion gases to power the engine. The combustor is assembled with a number of combustor liners, particularly for an inner surface of the combustion chamber, which usually is referred to as a hot surface, works in an extremely elevated temperature environment. Therefore, cooling air is provided through a plurality of holes in the combustor liners referred to as effusion cooling holes, into the combustion chamber over the hot surface in order to protect the combustor liners from damage resulting from the extremely elevated temperature environment within the combustion chamber. The effusion cooling air flow passing through the effusion cooling holes in the combustor liners must be accurately determined. Excessive effusion cooling air flow not only wastes compressor air but also adversely affects the appropriate conditions for combustion reaction in the combustion chamber, which in turn adversely affects engine performance.

Accordingly, there is a need to provide an improved method for making and repairing effusion cooling holes in a combustor liner in order to achieve an effusion cooling flow which does not exceed a predetermined level.

SUMMARY OF THE INVENTION

In one aspect, the described subject matter provides a method for making a hole as an air flow passage extending through a gas turbine engine component, the hole being sized to meet a required flow passing through the hole, the method comprising a) using a laser drilling tool to drill the hole on a first surface of the component, extending through the component and exiting from a second surface of the component, thereby forming an exiting edge of the hole with excess material melted during the drilling process remaining around the exiting edge of the hole; and b) deforming the excess material, thereby causing a marginal reduction in an effective diameter of the hole on the second surface.

In another aspect, the subject matter provides a method for making a hole as an air flow passage extending through a component of a gas turbine engine, the hole being sized to meet a required flow passing through the hole, the method comprising: a) using a laser drilling tool to drill the hole on a first surface of the component, extending through the component and exiting from a second surface of the component, thereby forming an exiting edge of the hole with excess material melted during the drilling process remaining around the exiting edge of the hole; b) conducting a flow check of the drilled hole in order to determine whether a measured flow through the hole is larger than the required flow and if the result is yes, then conducting the next step; c) deforming the excess material, thereby causing a marginal reduction in an effective diameter of the hole at the second surface; and d) power washing the component to remove loose debris of the excess material.

In a further aspect, the subject matter provides a method for making an air passage hole based on an existing hole, extending through a component of a gas turbine engine, the existing hole having been made by a laser drilling process and worn to a larger diameter than a required size after a period of engine operation, the larger diameter of the existing hole causing excess air to pass through the existing hole, the method comprising deforming an excess material melted during the drilling process of the existing hole and secured on a surface of the component and around an edge of the existing hole, thereby causing a marginal reduction in an effective diameter of the existing hole at the surface Further details of these and other aspects of the present invention will be apparent from the detailed description and figures included below.

DESCRIPTION OF THE DRAWINGS

Reference is now made to the accompanying drawings depicting aspects of the described subject matter, in which.

DETAILED DESCRIPTION OF THE PREFERRED EMBODIMENTS

Figure 1:
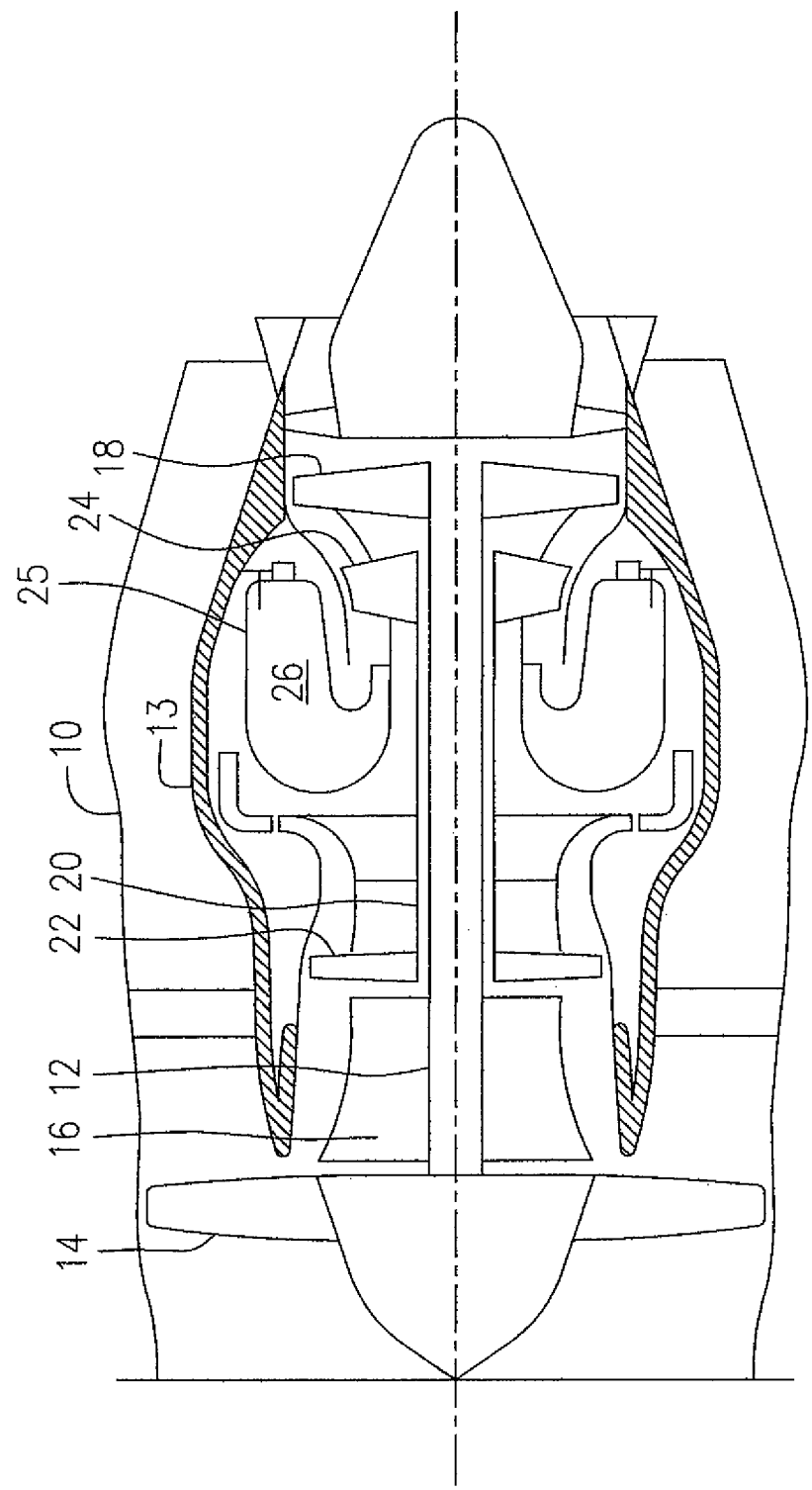
FIG. 1 is a schematic cross-sectional view of a gas turbine engine as an example of the application of the described subject matter.

FIG. 1 schematically illustrates a turbofan gas turbine engine which includes a housing or nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assembly 12 and 20 in order to define a main fluid path (not indicated) therethrough. In the main fluid path there is provided a combustion chamber 26 therein in which a combustion process takes place and produces combustion gases to power the high and low turbine assemblies 24 and 18. the combustor chamber 26 is assembled with a number of pieces of combustor liner 25.

Figure 2:
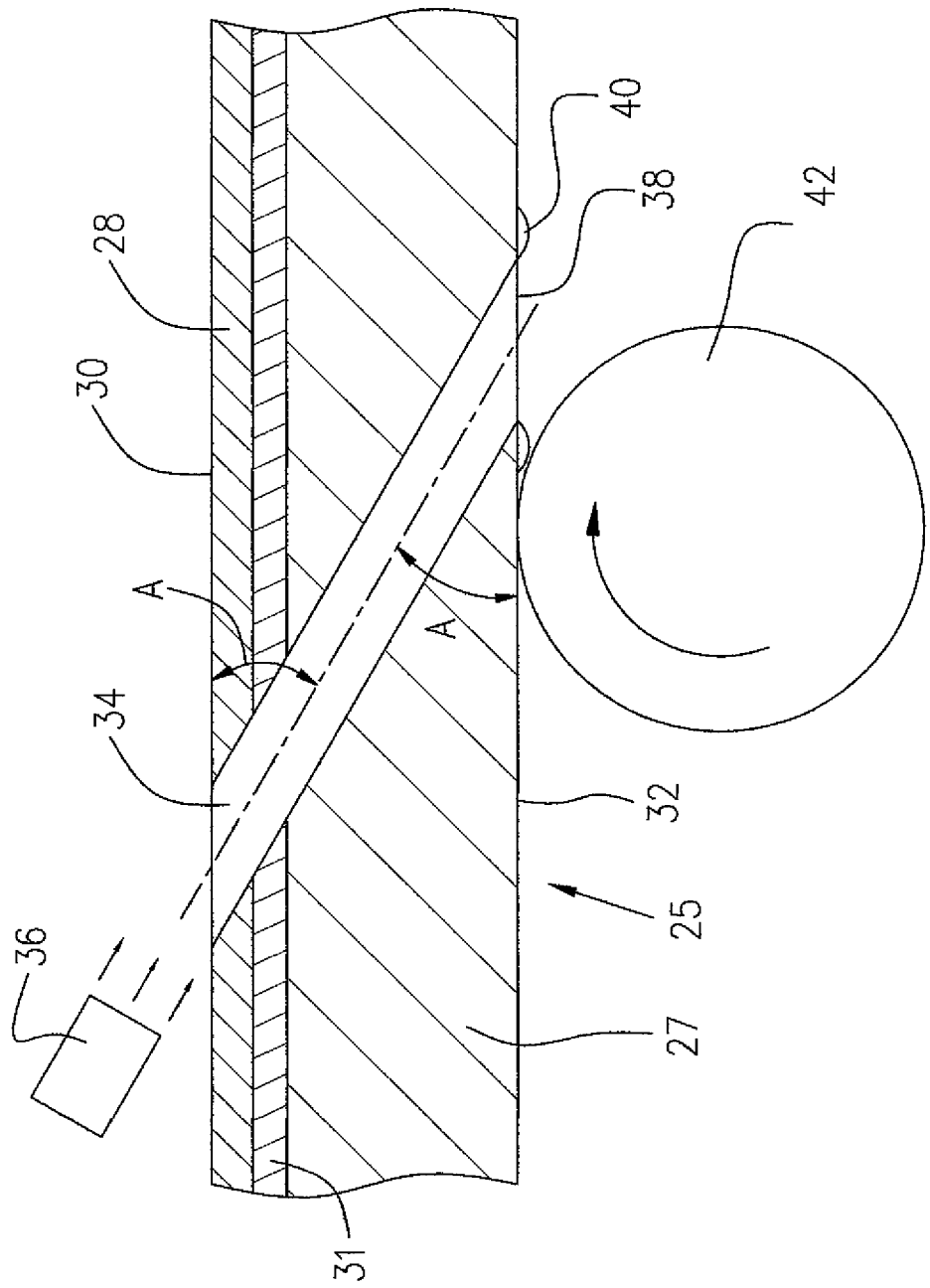
FIG. 2 is a schematic illustration of a method for making or repairing an effusion cooling hole in a piece of combustor liner according to one embodiment.

Referring to FIGS. 1 and 2, the combustor liners 25 may be made from composite material. For example, each piece of combustor liner 25 is made of appropriate metal material as a body 27 with a coating layer 28 attached to an inner side of the combustor liner 25. The coating layer 28 is made of a material which can tolerate extremely elevated temperatures and thus forms a hot surface 30 at the inner side of the combustor liner 25 to be exposed to the extremely elevated temperature environment within the combustion chamber 26. The coating layer 28 is bonded to the body 27 with a bond layer 31 disposed between the coating layer 28 and the body 27 of the combustor liner 25. A cold surface 32 is formed at the outside of the combustion liner 25 which is adapted to be not directly exposed to the hot combustion gases when the combustor liners 25 are assembled to form the combustion chamber 26. The combustor liner 25 is provided with a plurality of holes including effusion cooling holes 34. The effusion cooling hole 34 is relatively small and has an adequate size to form a cooling air passage allowing a predetermined cooling air flow (not indicated) to pass through the infusion cooling hole 34 into the combustion chamber 26.

The effusion cooling hole 34 extends through the combustor liner 25 at an acute angle A with respect to the hot and cold surfaces 30, 32 in order to direct the air flow discharged from the effusion cooling hole 34 to pass over the hot surface 30 of the combustor liner 25 and prevent the cooling air flow from being injected into a major combustion reaction area within the combustion chamber 26.

In a conventional mechanical drilling process, cutting forces acting on the combustor liner 25 may cause damage to the attachment of the coating layer 28 to the body 27. Therefore, the effusion cooling hole 34 may be formed in a laser drilling process in which laser beams from a laser drilling tool 36 are applied to the combustor liner 25 to melt a certain amount of material in a desired location on the combustor liner 25, thereby forming the required effusion cooling hole 34.

The laser beam may be applied to the hot surface 30 and into the combustor liner 25 and pass through the coating layer 28, bond layer 31 and the body 27, exiting from the cold surface 32 of the combustor liner during laser drilling process in order to avoid the risk of partially peeling the coating layer 28 off the body 27 of the combustor liner 25, which might occur if the laser beam passes through the combustor liner 25 from the cold surface 32 to the hot surface 30. For convenience of description, the opening end of the effusion cooling hole 34 defined on the cold surface 32 which is the laser beam exit end of the hole 34, is referred to as exit end 38 of the hole 34, although the exit end 38 of the effusion cooling hole 34 in use will be an air flow inlet end of the cooling passage formed by the hole 34.

During the laser drilling process, melted material of the combustor liner 25 is removed, resulting in the formation of the hole 34. However, a small amount of excess material 40 will remain on the cold surface 32 at the exit end 38 of the hole 34. The excess material 40 is positioned all around the edge of the exit end 38 of the hole 34 and slightly projects from the cold surface 32. The excess material 40 will be securely affixed on the cold surface 32 when it becomes solid from the melted state. The excess material 38 securely affixed on the cold surface 32 of the combustor liner 25 presents no adverse affect when the combustor liner 25 is installed in the engine for use and therefore there is no need for an additional process to remove the excess material 38 from the combustor liner 32.

As discussed, effusion cooling holes 38 in the combustor liner 25 must meet the diffusion cooling flow requirements of the engine. If such diffusion cooling flow requirements are not met, for example if the effusion cooling air flow through the holes 34 in the combustor liner 25 is more than the required effusion cooling air flow, the effusion cooling air flow must be adjusted. This adjustment may be achieved by deforming the excess material 40 around the edge of the exit end 38 of the hole 34, for example in a polishing process of the cold surface 32 of the combustor liner 25.

Figure 3:
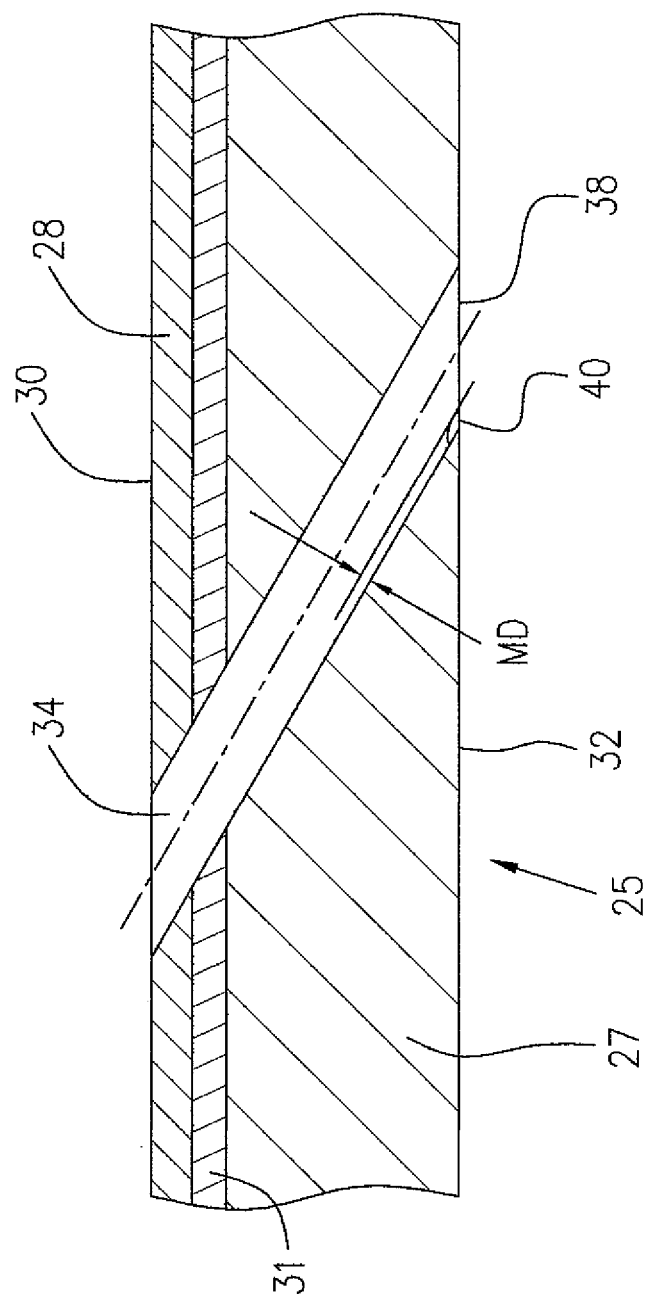
FIG. 3 is a partial cross-sectional view of a piece of combustor liner having an effusion cooling hole which is made or repaired with the method illustrated in FIG. 2 in order to have a marginal reduction in effective diameter of the hole to meet predetermined flow requirements.

Referring to FIGS. 2 and 3, as a result of the deforming process, at least a portion of the excess material 40 around the edge of the exit end 38 of the hole 34 is repositioned and securely attached within the hole 34, thereby causing a marginal reduction MD in the effective diameter of the hole 34 on the cold surface 32 of the combustor liner 25, as shown in FIG. 3.

As above described, the exit end 38 of the hole 36 in use, functions as an air flow inlet end of the effusion air flow passage formed by the hole 34 and therefore the at least a portion of the material repositioned within the hole 34 and securely attached to the edge of the hole 34, effectively restricts the hole inlet into which the effusion cooling air flow enters, resulting in an effective reduction in the effusion air cooling flow passing through the hole 34.

The polishing process according to one embodiment may be conducted using a polishing wheel 42 to roll onto the cold surface 32, pressing at least a portion of the excess material 40 into the hole 34.

If an air flow check of the drilled hole 34 determines that the air flow through the hole is larger than the required flow, the deformation process of the excess material 40 around the edge of the holes 34 at the cold surface 32 of the combustor liner 25 may be conducted to restrict the air flow to the requirement.

Optionally, prior to an assembly process of the combustor chamber 26 as shown in FIG. 1, a power washing process of the combustor liner may be conducted after the deformation process in order to remove any portions of the excess material 40 present as loose debris.

The above-described method may also be applicable to the repair of effusion cooling holes 34 in a combustor liner, the holes of which have been worn larger than a required size after a period of engine operation, thereby causing an effusion cooling air flow which is larger than the requirement, to pass through the holes. As above-described, the excess material 40 around the edge of the exit end 38 of the holes 34 on the cold surface 32 which were not removed during the manufacturing process of the combustor liner 25 may be deformed into the exit end 38 of the holes 34 by the method described above, provided that a similar deformation procedure was not previously conducted either in a manufacturing procedure or a maintenance service. A flow check of the hole 34 to determine whether a measured flow is larger than the required flow may not be required in the repair process, particularly when an existence of an excess cooling air flow is determined by other procedures such as observation of engine operation prior to the maintenance service of the engine.

The above description is meant to be exemplary only, and one skilled in the art will recognize that changes may be made to the embodiments described without departure from the scope of the described subject matter. For example, although effusion cooling holes in a combustor liner are described as an example of the method of making or repairing holes for required cooling air flow, the described method may be applicable to other gas turbine engine components which have holes used as air passages to meet desired requirements, drilled in a laser drilling process. For example, the described method may be used for making and repairing cooling holes in stationary wall parts having such cooling holes. The described subject matter may be applicable to any other type of engine or combustion chambers other than those illustrated in FIG. 1. Still other modifications which fall within the scope of the present invention will be apparent to those skilled in the art, in light of a review of this disclosure, and such modifications are intended to fall within the appended claims.

The invention claimed is:

1. A method for making a hole as an air flow passage extending through a combustor liner of a gas turbine engine, the hole being sized to meet a required flow passing through the hole, the method comprising:
   (a) using a laser drilling tool to drill the hole on a first surface of the combustor liner, extending through the combustor liner and exiting from a second surface of the combustor liner, thereby forming an exiting edge of the hole with excess material which is melted during the drilling process and then becomes solid, securely remaining around the exiting edge of the hole; and (b) deforming the solid excess material formed in step (a), and displacing the excess material from around the exiting edge of the hole into the hold to adjust the effective diameter of the hole.

2. The method as defined in claim 1 wherein in step (a) the excess material around the edge projects outwardly from the second surface.

3. The method as defined in claim 1 wherein in step (b) the deforming of the excess material is conducted in a polishing process of the second surface of the combustor liner.

4. The method as defined in claim 3 wherein the polishing process is conducted using a polishing wheel to roll onto the second surface and press at least a portion of the excess material into the hole.

5. The method as defined in claim 1 further comprising a flow check of the drilled hole prior to step (b), in order to determine whether or not the required flow is met.

6. The method as defined in claim 1 further comprising a step after step (b), of power washing the combustor liner to remove loose debris of the excess material.

7. The method as defined in claim 1 wherein the hole extending through the combustor liner is drilled from a hot surface toward a cold surface of the combustor liner.

8. A method for making a hole as an air flow passage extending through a combustor liner of a gas turbine engine, the hole being sized to meet a required flow passing through the hole, the method comprising:

(a) using a laser drilling tool to drill the hole on a first surface of the combustor liner, extending through the combustor liner and exiting from a second surface of the combustor liner, thereby forming an exiting edge of the hole with excess material which is melted during the drilling process and then becomes solid, securely remaining around the exiting edge of the hole;

(b) conducting a flow check of the drilled hole in order to determine whether a measured flow through the hole is larger than the required flow and if the result is yes, then conducting the next step;

(c) deforming the solid excess material formed in step (a) and pressing the excess material into the hole, thereby causing a marginal reduction in an effective diameter of the hole at the second surface; and (d) power washing the combustor liner to remove loose debris of the solid excess material.

9. The method as defined in claim 8 wherein the first surface is a hot surface of the combustor liner and the second surface is a cold surface.

10. The method as defined in claim 8 wherein in step (a) the excess material around the edge projects outwardly from the second surface.

11. The method as defined in claim 8 wherein in step (b) the deforming of the excess material is conducted in a polishing process of the second surface of the combustor liner.

12. The method as defined in claim 11 wherein the polishing process is conducted using a polishing wheel to roll onto the second surface and press at least a portion of the excess material into the hole.

13. A method for repairing an existing air passage hole extending through a combustor liner of a gas turbine engine, the existing hole having been made by a laser drilling process and worn to a larger diameter than a required size after a period of engine operation, the larger diameter of the existing hole causing excess air to pass through the existing hole, the method comprising deforming a solid excess material which was melted during the drilling process of the existing hole and then becomes solid and secured on a surface of the combustor liner and around an edge of the existing hole, wherein deforming includes pressing an excess material into the hold to adjust an effective diameter of the hold.

14. The method as defined in claim 13 wherein the deforming of the excess material is conducted in a polishing process of a cold surface of the combustor liner.

15. The method as defined in claim 14 wherein the polishing process is conducted using a polishing wheel to roll onto the cold surface and press at least a portion of the excess material into the existing hole.

* * * * *